(12) United States Patent
McGrew et al.

(10) Patent No.: US 9,576,003 B2
(45) Date of Patent: Feb. 21, 2017

(54) PROVIDING UNIQUE VIEWS OF DATA BASED ON CHANGES OR RULES

(71) Applicant: Palantir Technologies, Inc., Palo Alto, CA (US)

(72) Inventors: Robert J. McGrew, Los Altos, CA (US); Nathan Gettings, Palo Alto, CA (US); Stephen Cohen, Fremont, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 14/578,389

(22) Filed: Dec. 20, 2014

(65) Prior Publication Data

US 2015/0106347 A1    Apr. 16, 2015

Related U.S. Application Data

(63) Continuation of application No. 11/709,462, filed on Feb. 21, 2007, now Pat. No. 8,930,331.

(51) Int. Cl.
*G06F 17/30* (2006.01)
*G06Q 50/18* (2012.01)
(Continued)

(52) U.S. Cl.
CPC ..... *G06F 17/30309* (2013.01); *G06F 17/3023* (2013.01); *G06F 17/30356* (2013.01);
(Continued)

(58) Field of Classification Search
CPC .................................................. G06F 17/3023
(Continued)

(56) References Cited

U.S. PATENT DOCUMENTS

| 5,724,575 A | 3/1998 | Hoover et al. |
| 5,872,973 A | 2/1999 | Mitchell et al. |

(Continued)

FOREIGN PATENT DOCUMENTS

| AU | 2014206155 | 12/2015 |
| EP | 0652513 | 5/1995 |

(Continued)

OTHER PUBLICATIONS

Antoshenkov, Gennady, "Dictionary-Based Order-Preserving String Compression," The VLDB Journal, 1997, vol. 6, pp. 26-39.
(Continued)

*Primary Examiner* — Apu Mofiz
*Assistant Examiner* — Chelcie Daye
(74) *Attorney, Agent, or Firm* — Hickman Palermo Becker Bingham LLP

(57) ABSTRACT

In one embodiment, a method comprises creating and storing, in a revisioning database, one or more data objects; wherein a first plurality of the data objects is associated with a base realm representing data shared across all users of the database; wherein a second plurality of the data objects is associated with one or more child realms, wherein each of the child realms represents data local to a project, wherein each of the users is associated with one or more of the child realms; wherein the revisioning database associates each data object to a realm identifier value and to a version identifier value for a plurality of versions of the data object, wherein each of the versions represents a change to the data object by any of a plurality of users; receiving a request from a first user to view a third plurality of data objects in the revisioning database; selecting, based on the base realm, the particular realm, the version identifier value for the data objects in the third plurality, and one or more rules associated with the particular realm and the first user, data objects
(Continued)

in the third plurality that can be viewed by the first user; creating a particular data view that includes only the selected data objects; and providing a display of the particular data view to the first user.

16 Claims, 9 Drawing Sheets

(51) Int. Cl.
  *G06Q 50/26* (2012.01)
  *G06F 21/62* (2013.01)
(52) U.S. Cl.
  CPC .... *G06F 17/30418* (2013.01); *G06F 21/6218* (2013.01); *G06Q 50/18* (2013.01); *G06Q 50/26* (2013.01)
(58) Field of Classification Search
  USPC .......................................... 707/695; 709/229
  See application file for complete search history.

(56) References Cited

U.S. PATENT DOCUMENTS

| | | | |
|---|---|---|---|
| 5,897,636 A * | 4/1999 | Kaeser | G06F 17/30589 707/100 |
| 6,073,129 A | 6/2000 | Levine et al. | |
| 6,094,653 A | 7/2000 | Li et al. | |
| 6,161,098 A | 12/2000 | Wallman | |
| 6,243,717 B1 * | 6/2001 | Gordon | G06F 17/30309 707/695 |
| 6,304,873 B1 | 10/2001 | Klein et al. | |
| 6,366,933 B1 | 4/2002 | Ball et al. | |
| 6,418,438 B1 | 7/2002 | Campbell | |
| 6,510,504 B2 | 1/2003 | Satyanarayana | |
| 6,549,752 B2 | 4/2003 | Tsukamoto | |
| 6,560,620 B1 | 5/2003 | Ching | |
| 6,574,635 B2 | 6/2003 | Stauber et al. | |
| 6,745,382 B1 | 6/2004 | Zothner | |
| 6,976,210 B1 | 12/2005 | Silva et al. | |
| 6,980,984 B1 | 12/2005 | Huffman et al. | |
| 7,058,648 B1 | 6/2006 | Lightfoot et al. | |
| 7,111,231 B1 | 9/2006 | Huck et al. | |
| 7,194,680 B1 | 3/2007 | Roy et al. | |
| 7,440,978 B2 * | 10/2008 | Chan | G06Q 10/10 707/203 |
| 7,461,158 B2 * | 12/2008 | Rider | H04L 63/10 709/229 |
| 7,725,530 B2 | 5/2010 | Sah et al. | |
| 7,725,728 B2 | 5/2010 | Ama et al. | |
| 7,730,082 B2 | 6/2010 | Sah et al. | |
| 7,730,109 B2 | 6/2010 | Rohrs et al. | |
| 7,761,407 B1 | 7/2010 | Stern | |
| 7,814,084 B2 | 10/2010 | Hallett et al. | |
| 7,962,495 B2 | 6/2011 | Jain et al. | |
| 7,984,374 B2 | 7/2011 | Caro et al. | |
| 8,041,714 B2 | 10/2011 | Aymeloglu et al. | |
| 8,112,425 B2 | 2/2012 | Baum et al. | |
| 8,126,848 B2 | 2/2012 | Wagner | |
| 8,185,819 B2 | 5/2012 | Sah et al. | |
| 8,229,902 B2 | 7/2012 | Vishniac et al. | |
| 8,504,542 B2 | 8/2013 | Chang et al. | |
| 8,676,857 B1 | 3/2014 | Adams et al. | |
| 8,930,331 B2 | 1/2015 | McGrew et al. | |
| 8,954,410 B2 | 2/2015 | Chang et al. | |
| 9,009,827 B1 | 4/2015 | Albertson et al. | |
| 9,043,696 B1 | 5/2015 | Meiklejohn et al. | |
| 9,092,482 B2 | 7/2015 | Harris et al. | |
| 9,116,975 B2 | 8/2015 | Shankar et al. | |
| 9,208,159 B2 | 12/2015 | Stowe et al. | |
| 9,230,280 B1 | 1/2016 | Maag et al. | |
| 9,280,532 B2 | 3/2016 | Cicerone | |
| 2001/0051949 A1 | 12/2001 | Carey et al. | |
| 2001/0056522 A1 | 12/2001 | Satyanarayana | |
| 2002/0091694 A1 | 7/2002 | Hrle et al. | |
| 2003/0105759 A1 | 6/2003 | Bess et al. | |
| 2003/0115481 A1 | 6/2003 | Baird et al. | |
| 2003/0120675 A1 | 6/2003 | Stauber et al. | |
| 2003/0130993 A1 | 7/2003 | Mendelevitch et al. | |
| 2003/0212718 A1 * | 11/2003 | Tester | G06F 21/6227 707/203 |
| 2004/0111410 A1 | 6/2004 | Burgoon et al. | |
| 2004/0117345 A1 | 6/2004 | Bamford et al. | |
| 2004/0117387 A1 | 6/2004 | Civetta et al. | |
| 2004/0148301 A1 | 7/2004 | McKay et al. | |
| 2005/0097441 A1 * | 5/2005 | Herbach | G06F 21/10 715/229 |
| 2005/0108231 A1 | 5/2005 | Findleton et al. | |
| 2005/0114763 A1 | 5/2005 | Nonomura et al. | |
| 2005/0289524 A1 | 12/2005 | McGinnes | |
| 2006/0074881 A1 | 4/2006 | Vembu et al. | |
| 2006/0080316 A1 * | 4/2006 | Gilmore | G06F 17/30864 707/9 |
| 2006/0095521 A1 | 5/2006 | Patinkin | |
| 2006/0106847 A1 | 5/2006 | Eckardt et al. | |
| 2006/0116991 A1 | 6/2006 | Calderwood | |
| 2006/0161558 A1 | 7/2006 | Tamma et al. | |
| 2006/0218206 A1 | 9/2006 | Bourbonnais et al. | |
| 2006/0218405 A1 | 9/2006 | Ama et al. | |
| 2006/0218491 A1 | 9/2006 | Grossman et al. | |
| 2006/0242630 A1 | 10/2006 | Koike et al. | |
| 2006/0253502 A1 | 11/2006 | Raman et al. | |
| 2006/0265397 A1 | 11/2006 | Bryan et al. | |
| 2007/0050429 A1 | 3/2007 | Goldring et al. | |
| 2007/0061487 A1 | 3/2007 | Moore et al. | |
| 2007/0143253 A1 | 6/2007 | Kostamaa et al. | |
| 2007/0185850 A1 | 8/2007 | Walters et al. | |
| 2007/0233756 A1 | 10/2007 | D'Souza et al. | |
| 2007/0271317 A1 | 11/2007 | Carmel | |
| 2008/0015970 A1 | 1/2008 | Brookfield et al. | |
| 2008/0104060 A1 | 5/2008 | Abhyankar et al. | |
| 2008/0104149 A1 | 5/2008 | Vishniac et al. | |
| 2008/0195672 A1 | 8/2008 | Hamel et al. | |
| 2008/0201339 A1 | 8/2008 | McGrew | |
| 2008/0215546 A1 | 9/2008 | Baum et al. | |
| 2008/0270316 A1 | 10/2008 | Guidotti et al. | |
| 2008/0301378 A1 | 12/2008 | Carrie | |
| 2009/0031247 A1 | 1/2009 | Walter et al. | |
| 2009/0037417 A1 | 2/2009 | Shankar et al. | |
| 2009/0106308 A1 | 4/2009 | Killian et al. | |
| 2009/0164387 A1 | 6/2009 | Armstrong et al. | |
| 2009/0172669 A1 | 7/2009 | Bobak et al. | |
| 2009/0177962 A1 | 7/2009 | Gusmorino et al. | |
| 2009/0240664 A1 | 9/2009 | Dinker et al. | |
| 2009/0254971 A1 | 10/2009 | Herz | |
| 2009/0271435 A1 | 10/2009 | Yako et al. | |
| 2009/0313223 A1 | 12/2009 | Rantanen | |
| 2009/0313311 A1 | 12/2009 | Hoffmann et al. | |
| 2010/0036831 A1 | 2/2010 | Vemuri et al. | |
| 2010/0070489 A1 | 3/2010 | Aymeloglu et al. | |
| 2010/0076939 A1 | 3/2010 | Iwaki et al. | |
| 2010/0082541 A1 | 4/2010 | Kottomtharayil | |
| 2010/0114817 A1 | 5/2010 | Broeder et al. | |
| 2010/0114831 A1 | 5/2010 | Gilbert et al. | |
| 2010/0114887 A1 | 5/2010 | Conway et al. | |
| 2010/0138842 A1 | 6/2010 | Balko et al. | |
| 2010/0145909 A1 | 6/2010 | Ngo | |
| 2010/0161565 A1 | 6/2010 | Lee et al. | |
| 2010/0161688 A1 | 6/2010 | Kesselman et al. | |
| 2010/0191884 A1 | 7/2010 | Holenstein et al. | |
| 2010/0211550 A1 | 8/2010 | Daniello et al. | |
| 2010/0211618 A1 | 8/2010 | Anderson et al. | |
| 2010/0235606 A1 | 9/2010 | Oreland et al. | |
| 2010/0283787 A1 | 11/2010 | Hamedi et al. | |
| 2010/0318838 A1 | 12/2010 | Katano et al. | |
| 2010/0325581 A1 | 12/2010 | Finkelstein et al. | |
| 2011/0029498 A1 | 2/2011 | Ferguson et al. | |
| 2011/0047540 A1 | 2/2011 | Williams et al. | |
| 2011/0153592 A1 | 6/2011 | DeMarcken | |
| 2011/0161132 A1 | 6/2011 | Goel et al. | |
| 2011/0173619 A1 | 7/2011 | Fish | |
| 2011/0184813 A1 | 7/2011 | Barne et al. | |
| 2011/0258158 A1 | 10/2011 | Resende et al. | |

(56) References Cited

U.S. PATENT DOCUMENTS

| | | | |
|---|---|---|---|
| 2011/0258242 | A1 | 10/2011 | Eidson et al. |
| 2011/0270812 | A1 | 11/2011 | Ruby |
| 2012/0013684 | A1 | 1/2012 | Lucia et al. |
| 2012/0072825 | A1 | 3/2012 | Sherkin et al. |
| 2012/0123989 | A1 | 5/2012 | Yu et al. |
| 2012/0124179 | A1 | 5/2012 | Cappio et al. |
| 2012/0150791 | A1 | 6/2012 | Willson |
| 2012/0159307 | A1 | 6/2012 | Chung et al. |
| 2012/0330908 | A1 | 12/2012 | Stowe et al. |
| 2013/0036346 | A1 | 2/2013 | Cicerone |
| 2013/0097130 | A1 | 4/2013 | Bingol et al. |
| 2013/0151388 | A1 | 6/2013 | Falkenborg et al. |
| 2013/0304770 | A1 | 11/2013 | Boero et al. |
| 2013/0318060 | A1 | 11/2013 | Chang et al. |
| 2014/0149272 | A1 | 5/2014 | Hirani et al. |
| 2014/0181833 | A1 | 6/2014 | Bird et al. |
| 2014/0324876 | A1 | 10/2014 | Konik et al. |
| 2014/0344231 | A1 | 11/2014 | Stowe et al. |
| 2015/0039886 | A1 | 2/2015 | Kahol et al. |
| 2015/0089353 | A1 | 3/2015 | Folkening |
| 2015/0106347 | A1 | 4/2015 | McGrew et al. |
| 2015/0112956 | A1 | 4/2015 | Chang et al. |
| 2015/0212663 | A1 | 7/2015 | Papale et al. |
| 2015/0213043 | A1 | 7/2015 | Ishii et al. |
| 2015/0213134 | A1 | 7/2015 | Nie et al. |
| 2015/0227295 | A1 | 8/2015 | Meiklejohn et al. |
| 2015/0242397 | A1 | 8/2015 | Zhuang |
| 2015/0261817 | A1 | 9/2015 | Harris et al. |
| 2015/0341467 | A1 | 11/2015 | Lim et al. |
| 2016/0034545 | A1 | 2/2016 | Shankar et al. |
| 2016/0062555 | A1 | 3/2016 | Ward et al. |
| 2016/0147730 | A1 | 5/2016 | Cicerone |

FOREIGN PATENT DOCUMENTS

| | | |
|---|---|---|
| EP | 255126 A2 | 2/2013 |
| EP | 2863326 | 4/2015 |
| EP | 2891992 | 7/2015 |
| EP | 29993595 | 3/2016 |
| WO | WO 2012/025915 | 3/2012 |

OTHER PUBLICATIONS

"Apache HBase," <http://hbase.apache.org/> printed Sep. 14, 2011 in 1 page.
"BackTult—JD Edwards One World Version Control System," printed Jul. 23, 2007 in 1 page.
Baker et al., "Megastore: Providing Scalable, Highly Available Storage for Interactive Services," 5th Biennial Conference on Innovative Data Systems Research (CIDR '11), Jan. 9-12, 2011, Asilomar, California, pp. 12.
Bernstein et al., "Hyder—A Transactional Record Manager for Shared Flash," 5th Biennial Conference on Innovative Data Systems Research (CIDR '11), Jan. 9-12, 2011, Asilomar, California, pp. 12.
Chang et al., "Bigtable: A Distributed Storage System for Structured Data", Google, Inc., OSDI'06: Seventh Symposium on Operating System Design and Implementation, Seattle, WA, Nov. 2006, pp. 14.
Devanbu et al., "Authentic Third-party Data Publication," 2000, pp. 19, http://www.cs.ucdavis.edu/~devanbu/authdbpub.pdf.
Dreyer et al., "An Object-Oriented Data Model for a Time Series Management System," Proceedings of the 7th International Working Conference on Scientific and Statistical Database Management, Charlottesville, Virginia USA, Sep. 28-30, 1994, pp. 12.
Elmasri et al., "Fundamentals of Database Systems," 2004, Fourth Edition, pp. 455-491.
Klemmer et al., "Where Do Web Sites Come From? Capturing and Interacting with Design History," Association for Computing Machinery, CHI 2002, Apr. 20-25, 2002, Minneapolis, MN, pp. 8.

Kokossi et al., "D7—Dynamic Ontoloty Management System (Design)," Information Societies Technology Programme, Jan. 10, 2002, pp. 1-27.
Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.
Miklau et al., "Securing History: Privacy and Accountability in Database Systems," 3rd Biennial Conference on Innovative Data Systems Research (CIDR), Jan. 7-10, 2007, Asilomar, California, pp. 387-396.
Niepert et al., "A Dynamic Ontology for a Dynamic Reference Work", Joint Conference on Digital Libraries, Jun. 17-22, 2007, Vancouver, British Columbia, Canada, pp. 1-10.
Peng et al., "Large-scale Incremental Processing Using Distributed Transactions and Notifications" Proceedings of the 9th USENIX Symposium on Operating Systems Design and Implementation, USENIX, 2010, pp. 14.
"The Apache Cassandra Project," <http://cassandra.apache.org/> printed Sep. 14, 2011 in 3 pages.
Thomson et al., "The Case for Determinism in Database Systems," The 36th International Conference on Very Large Data Bases, Sep. 13-17, 2010, Singapore, Proceedings of the VLDB Endowment, vol. 3, No. 1, pp. 11.
Wollrath et al., "A Distributed Object Model for the Java System," Conference on Object-Oriented Technologies and Systems, Jun. 17-21, 1996, pp. 219-231.
Official Communication for Canadian Patent Application No. 2677464 dated Mar. 19, 2012.
Official Communication for Canadian Patent Application No. 2677464 dated Jan. 16, 2013.
Official Communication for European Patent Application No. 08730336.8 dated Jun. 6, 2012.
Official Communication for European Patent Application No. 13170952.9 dated Jan. 21, 2014.
International Search Report for International Patent Application No. PCT/US2008/054511 dated Jul. 31, 2008.
U.S. Appl. No. 14/746,671, filed Jun. 22, 2015, First Office Action Interview, Nov. 12, 2015.
U.S. Appl. No. 13/826,228, filed Mar. 14, 2013, Notice of Allowance, Mar. 27, 2015.
U.S. Appl. No. 14/504,103, filed Oct. 1, 2014, Notice of Allowance, May 18, 2015.
U.S. Appl. No. 14/451,221, filed Aug. 4, 2014, Notice of Allowance, Aug. 4, 2015.
U.S. Appl. No. 14/278,963, filed May 15, 2014, Notice of Allowance, Sep. 2, 2015.
U.S. Appl. No. 14/278,963, filed May 15, 2014, Final Office Action, Jan. 30, 2015.
U.S. Appl. No. 14/504,103, filed Oct. 1, 2014, First Action Interview, Feb. 5, 2015.
U.S. Appl. No. 14/504,103, filed Oct. 1, 2014, First Office Action Interview, Mar. 31, 2015.
U.S. Appl. No. 14/451,221, filed Aug. 4, 2014, Ex Parte Quayle Action, Apr. 6, 2015.
U.S. Appl. No. 14/580,218, filed Dec. 23, 2014, Office Action, Jun. 26, 2015.
U.S. Appl. No. 14/734,772, filed Jun. 9, 2015, First Office Action Interview, Jul. 24, 2015.
U.S. Appl. No. 14/746,671, filed Jun. 22, 2015, First Office Action Interview, Sep. 28, 2015.
U.S. Appl. No. 13/196,788, filed Aug. 2, 2011, Office Action, Oct. 23, 2015.
U.S. Appl. No. 14/734,772, filed Jun. 9, 2015, First Office Action Interview, Oct. 30, 2015.
U.S. Appl. No. 14/578,389, filed Dec. 20, 2014, Office Action, Oct. 21, 2015.
U.S. Appl. No. 14/192,767, filed Feb. 27, 2014, Notice of Allowance, Dec. 16, 2014.
U.S. Appl. No. 13/196,788, filed Aug. 2, 2011, Notice of Allowance, Dec. 18, 2015.
U.S. Appl. No. 14/841,338, filed Aug. 31, 2015, Office Action, Feb. 18, 2016.

(56) References Cited

OTHER PUBLICATIONS

U.S. Appl. No. 14/726,211, filed May 29, 2015, Final Office Action, Apr. 5, 2016.
U.S. Appl. No. 14/746,671, filed Jun. 22, 2015, Notice of Allowance, Jan. 21, 2016.
U.S. Appl. No. 13/196,788, filed Aug. 2, 2011, Interview Summary, Nov. 25, 2015.
U.S. Appl. No. 14/734,772, filed Jun. 9, 2015, Notice of Allowance, Apr. 27, 2016.
U.S. Appl. No. 14/996,179, filed Jan. 14, 2016, First Office Action, Interview, May 20, 2016.
U.S. Appl. No. 14/580,218, filed Dec. 23, 2014, Office Action, Jun. 7, 2016.
U.S. Appl. No. 14/849,454, filed Sep. 9, 2015, Notice of Allowance, May 25, 2016.
U.S. Appl. No. 14/961,830, filed Dec. 7, 2015, Office Action, May 20, 2016.
Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.
Hogue et al., "Thresher: Automating the Unwrapping of Semantic Content from the World Wide Web", 14th International Conference on World Wide Web, WWW 2005: Chiba, Japan, May 10-14, 2005, pp. 86-95.
Nierman, "Evaluating Structural Similarity in XML Documents", 6 pages, 2002.
Quest, "Toad for Oracle 11.6—Guide to Using Toad", pp. 1-162, Sep. 24, 2012.
Yang et al., "HTML Page Analysis Based on Visual Cues", A129, pp. 859-864, 2001.
Official Communication for European Patent Application No. 14189344.6 dated Feb. 20, 2015.
Official Communication for European Patent Application No. 14199182.8 dated Mar. 13, 2015.
Official Communication for European Patent Application No. 15183721.8 dated Nov. 23, 2015.
Official Communication for Netherlands Patent Application No. 2012436 dated Nov. 6, 2015.
Wikipedia, "Federated Database System," Sep. 7, 2013, retrieved from the internet on Jan. 27, 2015 http://en.wikipedia.org/w/index.php?title=Federated_database_system&oldid=571954221.
European Patent Office, "Search Report" in application No. 08 730 336.8-1951, dated Oct. 19, 2016, 4 pages.
European Claims in application No. 08 730 336.8-1951, dated Oct. 2016, 8 pages.

* cited by examiner

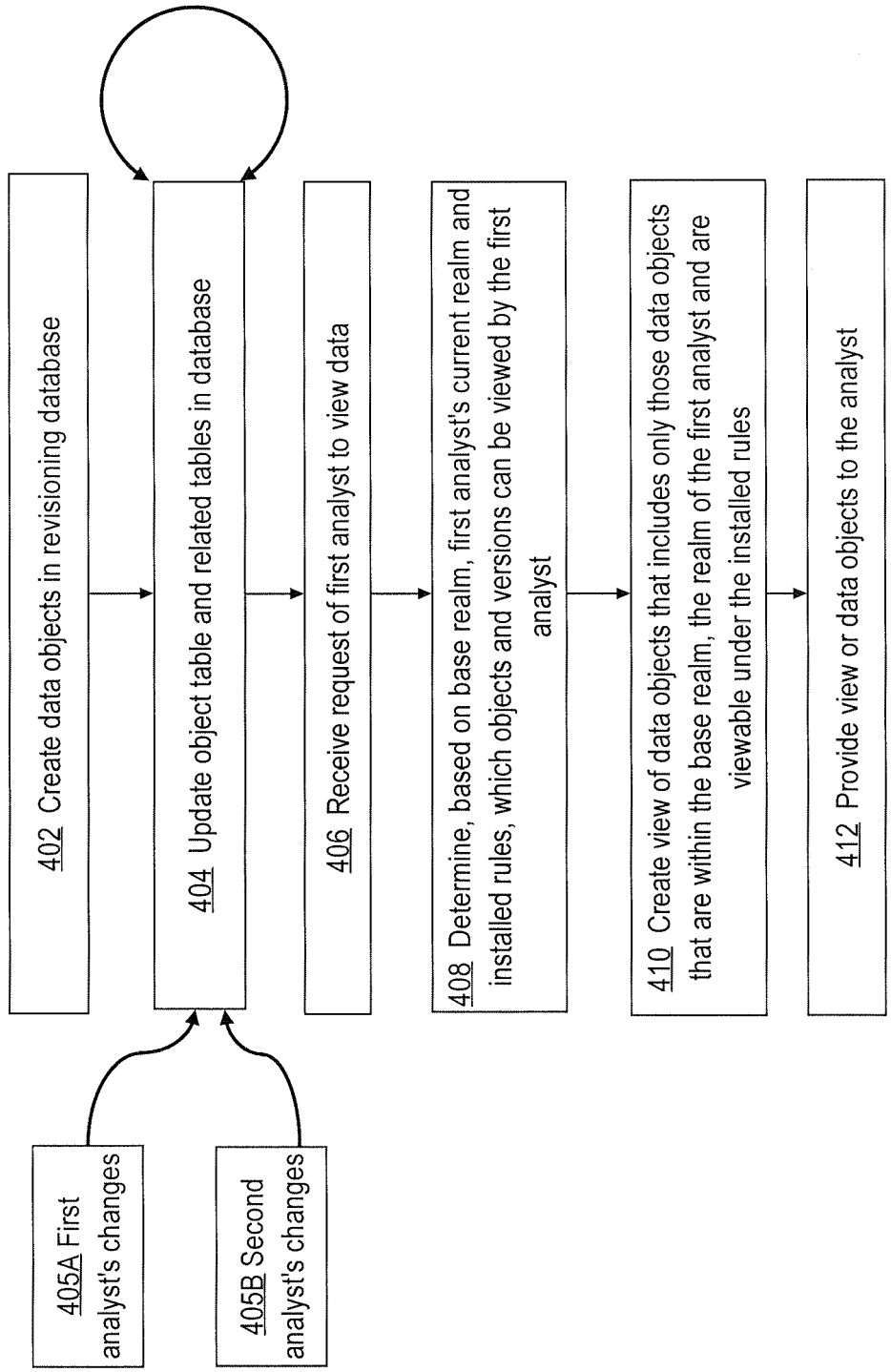

PROVIDING UNIQUE VIEWS OF DATA BASED ON CHANGES OR RULES

BENEFIT CLAIM

This application claims benefit and priority under 35 U.S.C. §120 as a Continuation of U.S. patent application Ser. No. 11/709,462, filed Feb. 21, 2007, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present disclosure generally relates to computer database systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-based revisioning database systems store data and provide the ability to track changes in database objects and examine a history of what changes were made, which user made the changes, and when the changes were made. Generally, all users of the revisioning database have the same view of the data. However, conventional revisioning database systems are poorly suited to the needs of certain users, such as intelligence analysts. Intelligence database systems typically store highly sensitive and confidential data that is distributed on a "need to know" basis. Security considerations in intelligence analysis impose restrictions on who can access or receive particular kinds of views of data, but revisioning databases do not typically implement controls on access to views. Intelligence analysts often work on multiple discrete investigations that may draw data from the same centralized revisioning database, but one analyst is not typically allowed to view every investigation, or the data associated with every investigation, or changes made by another analyst, even if the same data is associated with that analyst's own investigations.

Further, distribution of copies of intelligence data is typically restricted, but in conventional revisioning database systems users are permitted to maintain a local mirror copy of at least a portion of the data. The use of a local mirror is not acceptable to the intelligence community. Thus, there is a need for improved ways to distribute selected views of data Further, changes in intelligence data may be associated with reasons for the changes that are useful to track and display in connection with a change history of the revisioning database. However, conventional revisioning databases do not allow a user to associate change reasons or other annotations with a change history from the database.

SUMMARY

Unique views of data are provided to realms and/or users based on changes to the data or rules. In one embodiment, a method comprises creating and storing, in a revisioning database, one or more data objects; wherein a first plurality of the data objects is associated with a base realm representing data shared across all users of the database; wherein a second plurality of the data objects is associated with one or more child realms, wherein each of the child realms represents data local to a project, wherein each of the users is associated with one or more of the child realms; wherein the revisioning database associates each data object to a realm identifier value and to a version identifier value for a plurality of versions of the data object, wherein each of the versions represents a change to the data object by any of a plurality of users; receiving a request from a first user to view a third plurality of data objects in the revisioning database; selecting, based on the base realm, the particular realm, the version identifier value for the data objects in the third plurality, and one or more rules associated with the particular realm and the first user, data objects in the third plurality that can be viewed by the first user; creating a particular data view that includes only the selected data objects; and providing a display of the particular data view to the first user.

In one embodiment, the selecting comprises selecting all objects of the third plurality that are in the base realm. In another embodiment, the selecting comprises selecting all objects of the third plurality that are in each child realm then currently associated with the first user.

In another embodiment, the method further comprises receiving definitions of one or more rules, wherein each rule specifies whether one or more data objects may be provided to a specified child realm; selecting the data objects in the third plurality based upon the rules as well as the base realm the particular realm, and the version identifier value for the data objects.

Still another embodiment provides for receiving the definitions of the one or more rules from a user, other than the first user, who is associated with realm with which the second plurality of data objects is associated. In another embodiment, the method comprises receiving a request of the first user to subscribe to the data objects in a specified child realm; determining that a change has occurred in at least some of the data objects; selecting the third plurality of data objects based on determining whether the data objects that have changed can be provided to the first user based on the base realm, the particular realm, and the version identifier value for the data objects.

In another embodiment, providing the particular data view to the first user comprises providing only particular rows of the revisioning database to the first user. In an embodiment, the creating and storing comprises creating and storing an object table comprising rows that represent versions of data objects and columns that represent, for each of the versions, an associated realm, a version value, and a pointer to a previous version.

In an embodiment, the method further comprises asynchronously concurrently receiving, from different users, a plurality of changes to one data object, and in response thereto, creating a new row in the object table for each of the changes, wherein realm columns comprise realm identifiers of realms that are then currently associated with the different users.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A illustrates displaying data from a revisioning database based on realms and rules;

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In an embodiment, a revisioning database and a method of using the revisioning database enable showing a unique view of database data to each analyst based on his or her changes to the database data, and to synchronize the view with a central repository of data. In an embodiment, a publish-subscribe model is implemented for distribution of data to analysts. Collaborative use of selected data is possible. For example, an analyst working on a particular intelligence investigation determines a view of data, which may be equivalent to identifying selected rows of an RDBMS table, for publication to other analysts, who can subscribe to the view. A subscribing analyst receives and stores only the published rows or row-equivalents. Unlike prior approaches, subscribers do not maintain a local mirror, and therefore security is increased. Each analyst can only change his/her own data.

In an embodiment, a revisioning database and a method of using the revisioning database enable showing a unique view of database data to a particular analyst among a plurality of analysts based on a set of rules governing what data can be seen by the analyst. In an embodiment, a security rules wizard generates views of the data.

I. Revisioning Database System

The techniques described herein may be used in many different database applications. In an embodiment, a revisioning database system stores data collected in intelligence operations by intelligence analysts or other members of an intelligence community. "Intelligence," in this context, refers to information about people, places, and events that is useful to a government or military organization in relation to issues of security or defense, and may include information obtained in covert operations or open operations. Other embodiments may be used in fields other than intelligence analysis. In an embodiment, the revisioning database system records metadata about changes to stored data, facilitates UNDO and REDO operations, can receive requests to subscribe to particular data and publish updates to such data for delivery to subscribers, and performs other functions.

Figure 1:
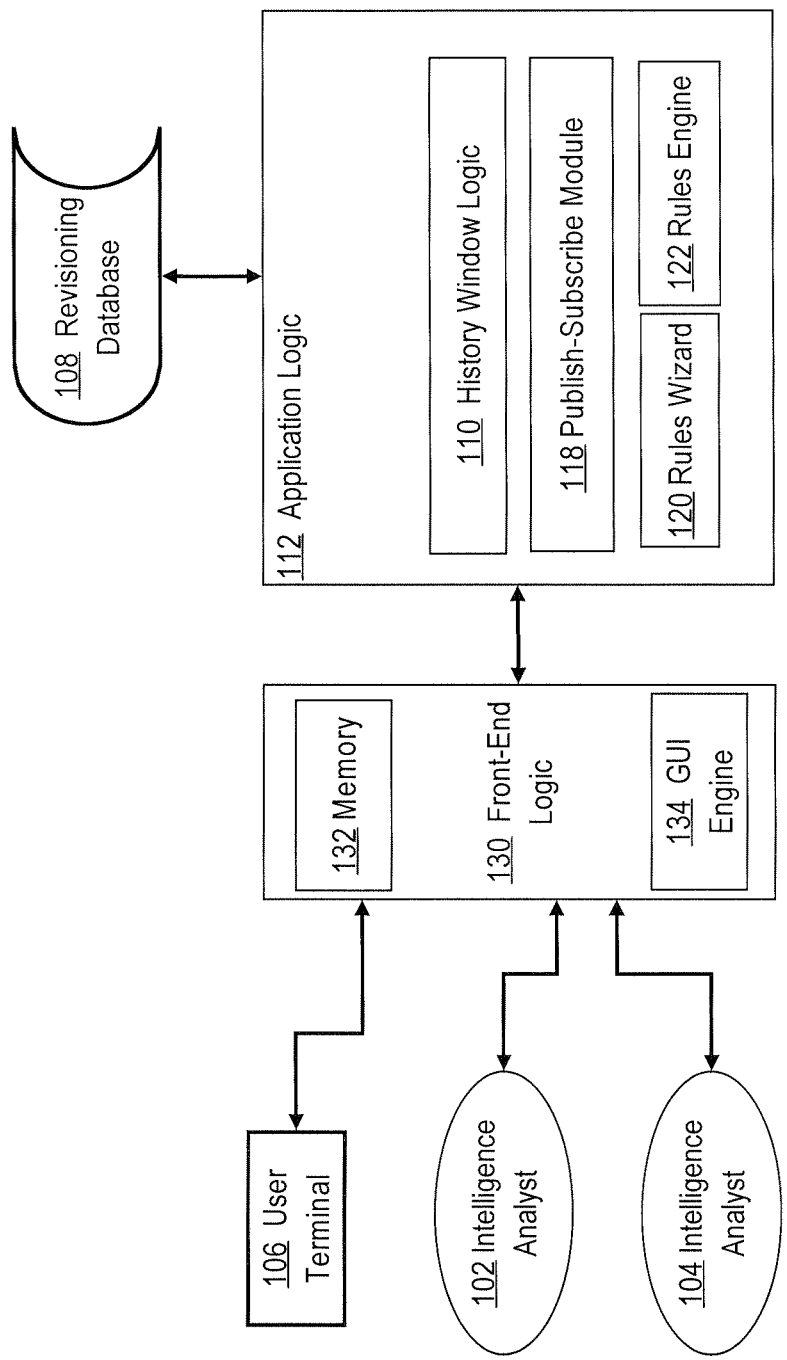
FIG. 1 illustrates a revisioning database system.

FIG. 1 illustrates a revisioning database system. A revisioning database 108 is coupled to application logic 112, which implements the functions described herein for interacting with and using the revisioning database 108 in association with data such as intelligence community data. A user terminal 106 is coupled to front-end logic 130, which is coupled to application logic 112. The user terminal 106 of FIG. 1 broadly represents any host computer of an intelligence analyst, database administrator, or other user who interacts with revisioning database 108 through application logic 112.

One or more other intelligence analysts 102, 104 can access application logic 112 through front-end logic 130 to obtain information from revisioning database 108 and to obtain services of the application logic. The intelligence analysts 102, 104 may be located in discrete security domains and different geographical locations, or may be co-located and/or within the same security domain. Each of the intelligence analysts 102, 104 may access application logic 112 through a host computer that is coupled directly or indirectly through one or more networks, network links, or internetworks to the application logic. User terminal 106 and the host computers of the intelligence analysts 102, 104 may comprise a personal computer, workstation, or other data processing system.

Front-end logic 130 comprises a memory 132 that stores copies of objects from revisioning database 108 for use in front-end operations, and a GUI engine 134 that generates graphical user interface displays for presenting data objects on user terminal 106 or displays of the intelligence analysts 102, 104.

In an embodiment, application logic 112 comprises history window logic 110, publish-subscribe module 118, rules wizard 120, and rules engine 122. History window logic 110 is configured to generate views and displays of historical states of objects in revisioning database 108 and historical states of graphs, comprising nodes representing the objects, which have been displayed by GUI engine 134. Publish-subscribe module 118 comprises logic configured to implement receiving and storing requests of analysts to subscribe to particular data views, detecting updates in data, and generating and sending publications of updated data to subscribers. Rules wizard 120 is configured to permit users to define rules that specify how objects in revisioning database 108 can be accessed and exported, as further described below. Rules engine 122 facilitates controlled publication and viewing of objects from revisioning database 108 based on realms and rules defined using the rules wizard 120.

In an embodiment, export module 114, publish-subscribe module 118, rules wizard 120 and rules engine 122 may be implemented in a single computer program or module or may be integrated into revisioning database 108. Functions of rules wizard 120 may be implemented in whole or in part in front-end logic 130. Thus, the structural separation of functional modules as shown in FIG. 1 is not required and the same functions described herein for such functional modules may be implemented structurally in any other convenient manner.

Figure 2:
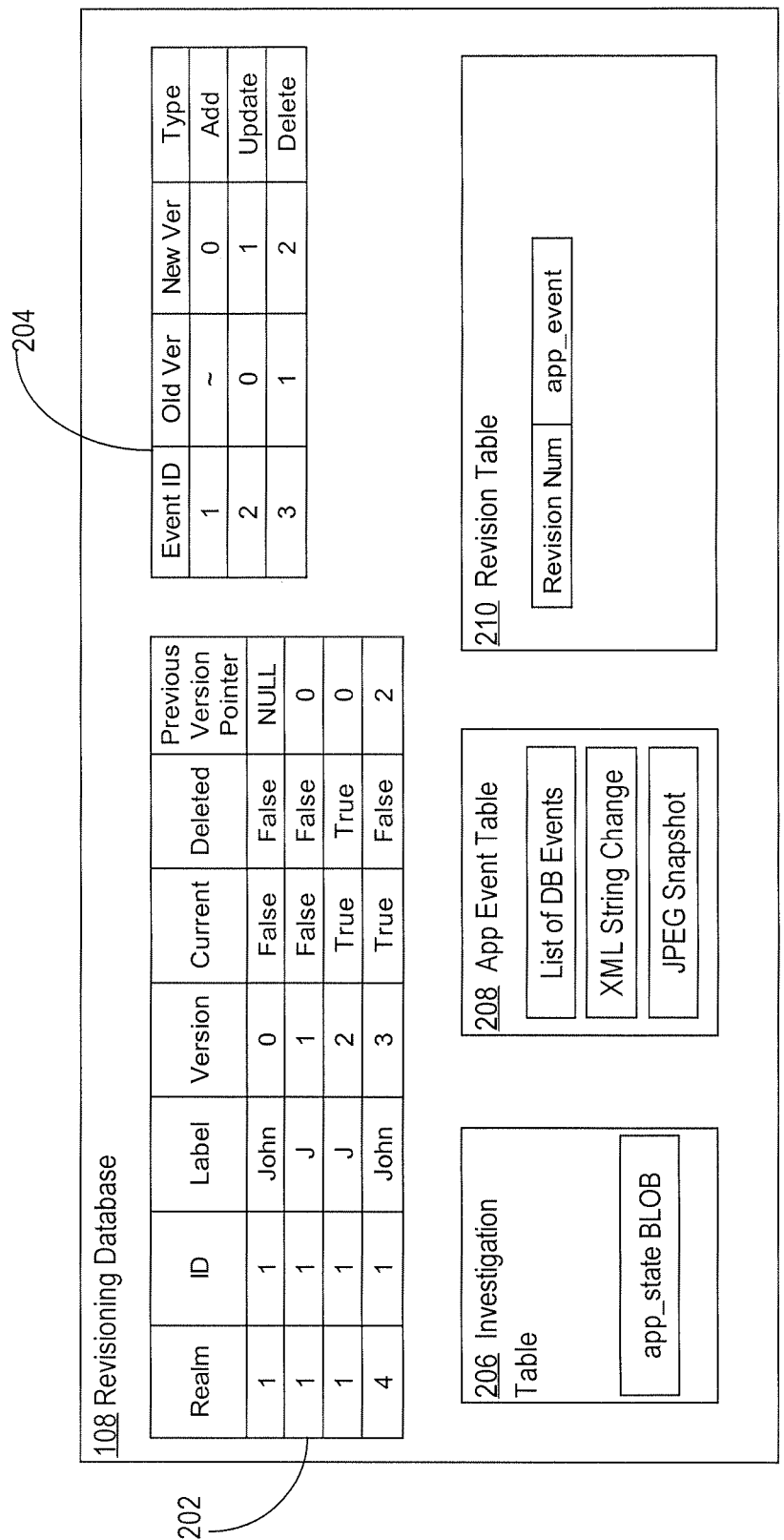
FIG. 2 illustrates internal organization of a revisioning database.

FIG. 2 illustrates internal organization of a revisioning database with example hypothetical data. In an embodiment, as an overview, revisioning database 108 comprises an object table 202, an event table 204, an investigation table 206, an "App Event" table 208, and a revision table 210. In an embodiment, revisioning database 108 may comprise other tables and functional modules for performing support functions and other functions that are not essential to the invention herein. In an embodiment, object table 202 comprises a plurality of rows that store metadata relating to successive versions of one or more objects that are stored in the revisioning database 108 as such objects undergo operations such as addition to the database, changes, and deletion. Event table 204 comprises a plurality of rows that identify, for a one or more particular database objects, all events that have occurred for that object such as adding the object to the database, updating, and deleting.

In an embodiment, object table 202 and event table 204 implement row-based journaling of object changes to provide a revisioning database useful for intelligence analysis. Further, object table 202 permits associating different versions of data in a database object with different data realms. The use of realms, which are described further below, generally enables controlled and selective publication of data to users associated with different investigations may see only particular data from the revisioning database 108.

A simplified example using the hypothetical data shown in object table 202 and event table 204 of FIG. 2 is now described. In an embodiment used herein to illustrate a clear example, the object table 202 comprises columns identifying a Realm, unique object identifier (ID), Label, Version, Current flag, a Deleted flag, and a Previous Version Pointer; other embodiments may include other columns. Further, in the following description certain numbers and other values are provided as examples, but other data types may be used in other embodiments. An example of row-based journaling of object changes to implement a revisioning database is now described, using a hypothetical scenario involving a user adding one database object, updating the object, and deleting the object.

Based on the first row of object table 202, assume that a particular database object having an ID of 1 and a label of "John" is added to the database. The object is given version 0 since this is the first version of the object that has been operated upon, and in Realm 1 version 0 is the current version and the object is not deleted. The Previous Version Pointer is null since no earlier version of the same object exists. The event of adding the object John to the database is reflected by adding a new row to event table 204. In the first row of event table 204 an event having Event ID 1 indicates that the John object, which has an object identifier of "255002," had an old version number of Null, new version number of 0, and an Add operation was performed. Successive events receive other unique event identifiers.

Now assume that the same object is updated by changing its label to "J" rather than "John." The update event is reflected by adding a second row to event table 204 in which a second event having ID 2 specifies that the old version of the John/J object was 0, the new version is 1, and the type of operation was Update. Further, because the John/J object changed, a new row is also added to the object table 202, as indicated in the second row of the object table in which object ID 1 has the new label J at version 1, and is current and not deleted. The Previous Version Pointer of the J object points to the first row of the table containing object version 0, and although FIG. 2 shows a value of "0" in the Previous Version Pointer for clarity, the Previous Version Pointer may be implemented as a pointer object rather than an integer. The Current flag of the first row of the object table 202 is changed, but otherwise the first row is not edited or updated; instead, a new row is added and the Current flags are updated to indicate that the first row is not current and the second row is current.

Next assume that the J object is deleted from the database. The third row of event table 204 reflects a Delete event for the old version 1 of the object and indicates that the new version of the deleted object is 2. A third row is also added to object table 202 and indicates that the J object at version 2 is current but also is deleted, as the Deleted flag is false. The Previous Version Pointer indicates object version 0. The preceding information all applies to Realm 1 as indicated in the first column of object table 202. However, the object table 202 also can maintain separate information for the same object in association with a different realm, such as Realm 4. In this realm, the same object having an ID of 1 is labeled John and is current but not deleted. In cooperation with application logic 112, the separation of realms in object table 202 ensures that a first user who is working on an intelligence investigation that is classified in Realm 1 will see the object with ID 1 as "J", whereas a second user who is working in Realm 4 will see the same object as "John."

Thus, each row in the object table 202 has a revision value reflecting a time at which that row was valid and was the current revision. Although the preceding example has focused on object labels, the same mechanisms effectively implement controls on all aspects of object data. Thus, because a database object may comprise any form of stored data such as strings, numbers, links, blobs, and other information, the same controls described herein will enable a first analyst in one realm to see one view of even a complex object whereas a second analyst in another realm sees a different view of the object. Event table 204 tracks all events associated with all objects.

The investigation table 206 comprises information about active intelligence investigations; in an embodiment, a state BLOB object is used to store metadata about an investigation.

In an embodiment, application logic 112 can generate and display a graphical user interface (GUI) that includes a graph of nodes that represent database objects that in turn represent people, places, events and things involved in an investigation. In later sections relating to FIG. 5 and other drawing figures, an example GUI is described. The "App Event" table 208 stores information that can be used to display a graph of database objects or a graphical snapshot of database events. In an embodiment, the "App Event" table 208 stores a list of database events, a string description of a graph of objects in a GUI display, and a graphical snapshot of a display of an object history. For example, when an object is added to the revisioning database 108 and a corresponding node is displayed in a GUI display as part of a graph of nodes representing objects, the "App Event" table 208 is updated with an event representing the addition of the node, and a string description of the changed graph. In an embodiment, the graph is stored as an XML string or blob, and the graphical snapshot is a graphics file such as a JPEG file.

The revision table 210 correlates object revision numbers to application events that uniquely relate to a particular form of a displayed graph of nodes. For the preceding example values of object table 202 and event table 204, the contents of revision table 210 would specify that the user progressed in order as follows: App event 0, object revision 0; App event 1, revision 1; App event 0, revision 2; App event 2, revision 3. Thus, as the "John/J" object progressed among versions 0, 1, 2, and 3, the displayed graph had the form associated with App event 0, 1, back to 0, and then 2. The revision table 210 enables application logic 112 to essentially store a linear version of a revision tree that represents states of the displayed graph, thereby facilitating UNDO and REDO operations for displayed graphs.

Figure 3:
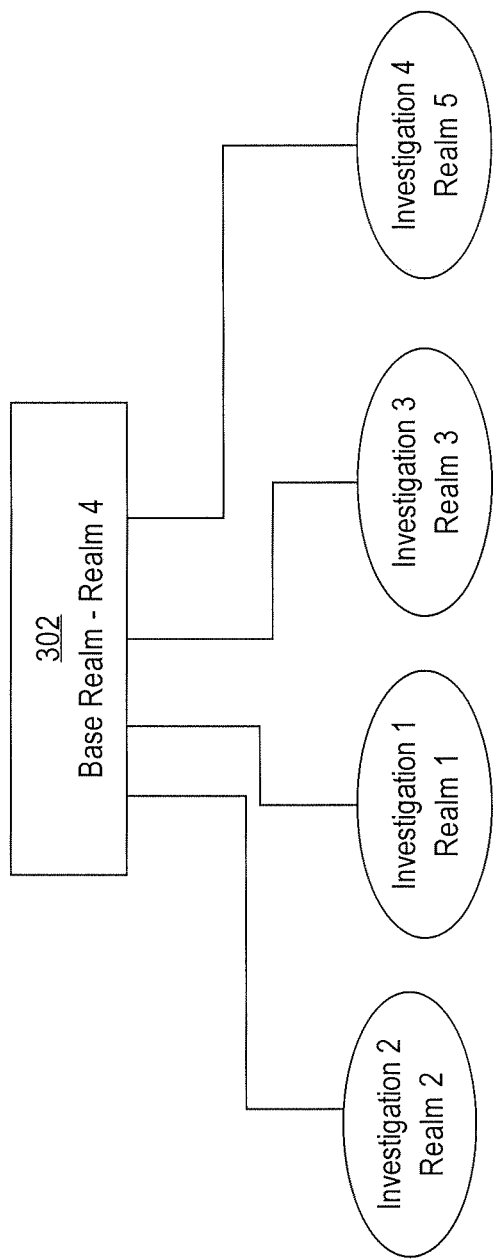
FIG. 3 illustrates organization of realms and investigations.

In an embodiment, application logic 112 associates information in revisioning database 108 with realms that facilitate controlled viewing of objects and controlled publishing of objects of the database to other analysts and users. FIG. 3 illustrates an example organization of realms. In an embodiment, application logic 112 implements a base realm 302, also termed a repository realm or parent realm and one or more other investigative realms or child realms 1, 2, 3, 5, each of which may be associated with one or more projects such as intelligence investigations. The base realm 302 contains data that is shared among all users of the revisioning database 108. Thus, the base realm may represent information that is available to all people who are involved in a team and need to share information.

In an embodiment, an investigative realm or child realm contains data local to a particular project or investigation. While a user can have many investigations, data that is local to another project or investigation of the same user is not more accessible than data local to another user's project or investigation. Thus realms implement controls on data viewing and distribution, rather than user roles or privileges.

For example, the base realm 302 may be denoted Realm 4 and there may be four other realms denoted Realm 1, Realm 2, Realm 3, and Realm 5 each associated with a particular investigation. In an embodiment, application logic 112 implements functions for creating and defining realms, which intelligence investigations are considered within a particular realm, and which objects of revisioning database 108 are considered within a particular realm. As seen in FIG. 2, each object identified in object table 202 has a realm attribute in a column of the object table. Further, application logic 112 implements functions for defining which analysts or users are associated with a particular realm. Information identifying realms, investigations with realms, and analysts within realms may be stored in one or more tables in database 108 or in memory 132.

In this arrangement, an analyst on Investigation 1 in Realm 1 may publish a set of database events from event table 104 to the base realm, Realm 4. The set of events that are published is dictated by a path through the "App Event" tree according to the revision table 210. A different analyst within Realm 3 can subscribe to events associated with Investigation 1. If the analyst in Realm 3 is permitted to receive information from Investigation 1, based on security clearances of the analyst and controls enforced in the publish-subscribe logic module 118, application logic 112 sends copies of selected data rows for Investigation 1 to the analyst in Realm 3. Thus, analysts do not send data directly among themselves. Instead, each analyst publishes data to the base ream 302, and the publish-subscribe module 118 enforces security controls and rules to determine whether a data object can be provided or exported from the database 1008 to a requesting analyst, as further described below for FIG. 4A and FIG. 4B.

In an embodiment, application logic 112 comprises a rules wizard 120 that enables a user or analyst to define one or more restrictions on database objects, properties, or attributes. For example, an analyst can use rules wizard 120 to define rules under which database objects may be exported to other analysts. As a particular example, a rule can specify that a social security number object cannot be exported. As another example, a rule can specify that when a first analyst is a US citizen, an object can be exported to the first analyst in a database view, but when a second analyst is not a US citizen, the same object cannot be exported to the second analyst. Rules can specify decision trees of arbitrary complexity. Rules can apply to objects as a whole or to particular properties of objects.

Rules defined using rules wizard 120 are applied to current versions of objects in revisioning database 108 when a user is generating a Summary View or exporting an investigation, which are described in the next section. In an embodiment, at the time that a user requests an investigation to be exported, the rules wizard 120 examines the current version of each object in the investigation and determines, whether security controls permit actually exporting that object. When objects are created, the objects may be tagged with object properties that specify minimum required security clearance levels to access the objects. During the export operation, the rules wizard compares the security clearance property to the actual security clearance of a person or location to which the export is directed. In one rule implementation, only an analyst holding a security clearance level equal to or greater than the security clearance level of an object can receive an export of that object. If a security control violation is detected, then the object subject to security control is omitted from the export file. An effect of the mechanism defined herein is that an administrator can define a broad policy for security control that is automatically enforced in the system.

Rules defined using rules wizard 120 also can specify how a particular object may be exported from one realm to another realm; that a particular object must be deleted from the database as it is exported; that a particular object may be exported to an export data file format such as XML, PowerPoint, or other data file format; whether a particular analyst can open a particular investigation and receive a display of particular objects; and that a particular object may not be exported from a server that holds the revisioning database to a front-end display application.

Figure 4B:
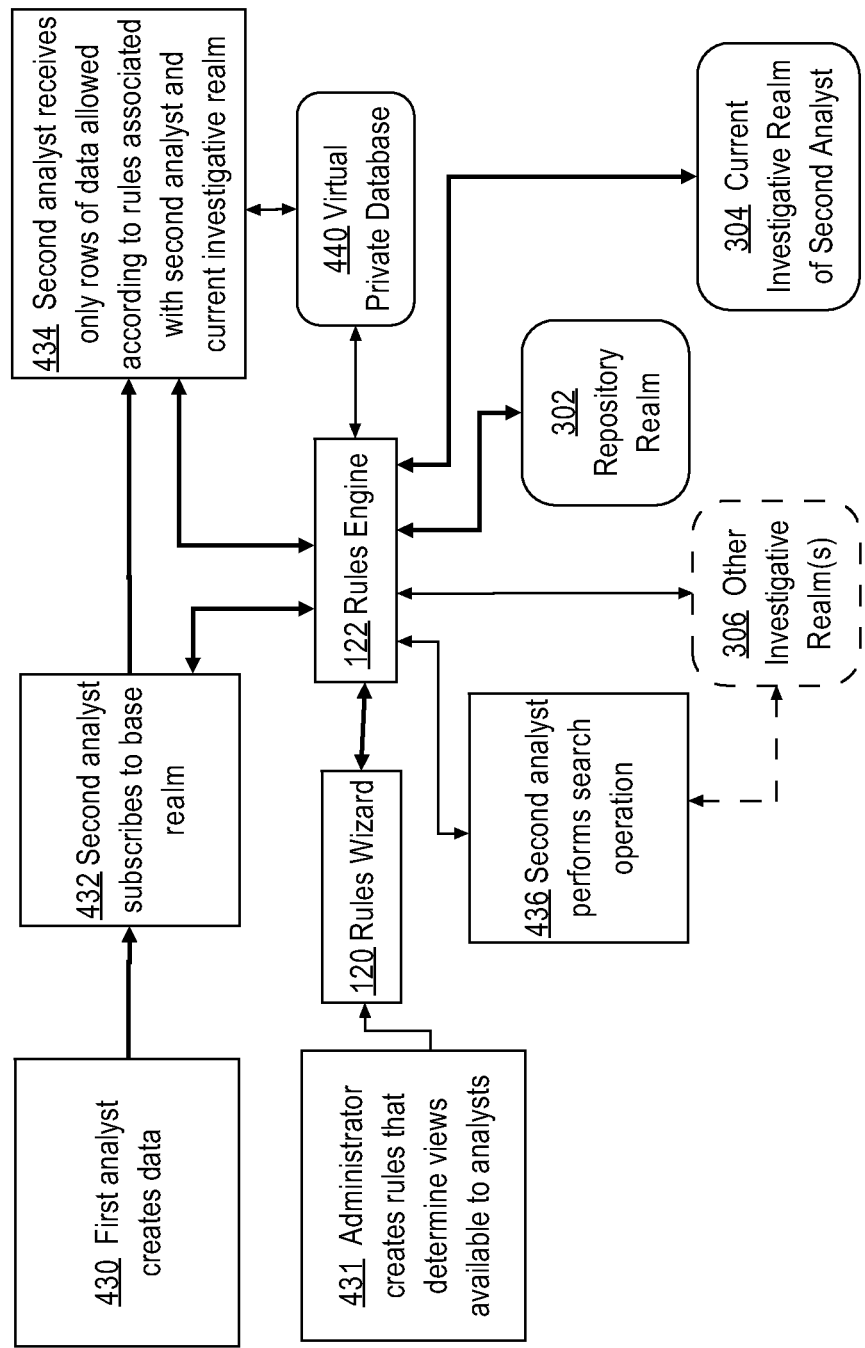
FIG. 4B illustrates operation of a revisioning database system using a publish-subscribe model to provide a virtual private database.

The functional elements, data structures, and techniques described above may be used in many data processing operations applicable to intelligence analysis and other fields. As examples, FIG. 4A illustrates displaying data from a revisioning database based on realms and rules, and FIG. 4B illustrates operation of a revisioning database system using a publish-subscribe model to provide a virtual private database.

Referring first to FIG. 4A, in one embodiment, in step 402 a method comprises creating and storing, in a revisioning database, one or more data objects. In an embodiment, the data objects are subjects of intelligence investigations, events in intelligence investigations, or other data relevant to intelligence investigations. One or more analysts or other users asynchronously dynamically change the data objects or values of properties of the data objects. For example, changes from a first analyst are received at one particular time (step 405A) and changes from a second analyst are received (step 405B) at the same time or any other time. In step 404, the object table and related tables in the revisioning database are updated based on the received changes, using a journaling approach that tracks the history of changes as described above for FIG. 2. Any number of updates may be received and processed. When changes are stored, a realm of the changed object is stored in connection with the object, based on a realm that is then currently associated with the user making the change. As a result, the revisioning database stores data objects, all changes to the data objects, and metadata identifying realms with which the objects are associated at the time of each change.

In step 406, a request is received from a first analyst to view data. The first intelligence analyst is working within a particular investigative realm at the time of the request. Thus, each request to view data includes a realm to which a view of the data is to be delivered. A request may seek access to a different investigative realm for the requesting analyst. A request also may comprise performing an expansion view operation on a presently displayed data object, in which the data object is linked to or associated with other data objects in the current investigative realm or other investigative realms.

In step 408, the method automatically determines, based on the base realm, the first analyst's current realm, rules installed for the current realm, and version information for data objects, which data objects the first analyst can view. Step 408 may comprise retrieving, from the revisioning database 108, information identifying all data objects that are responsive to the user's request and that have realm values matching the current investigative realm, or that are in the base realm. Further, step 408 comprises retrieving or identifying only the current version of each object that is in the base realm of the user's current investigative realm.

Figure 4C:
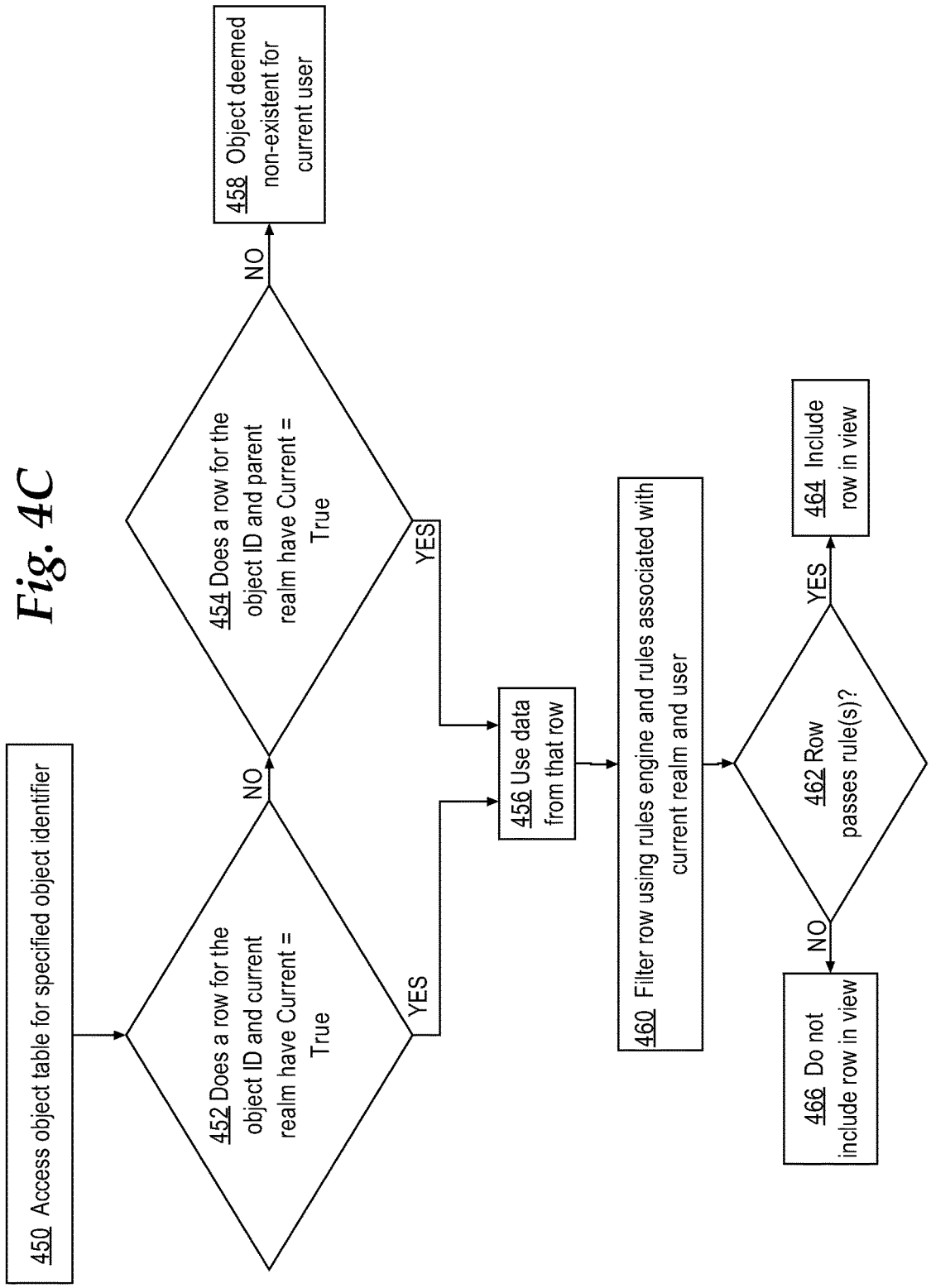
FIG. 4C illustrates determining whether a specified object is part of a view for a particular user and realm.

Step 408 may be implemented using the table structure of FIG. 2 and logic to read table rows, identify realm values that match the base realm and the user's current investigative realm, and identify the most current version of each data object. In an embodiment, the viewable version of an object with a particular object identifier is determined as shown in FIG. 4C and as follows:

a. In step 450, the object table (FIG. 2) is accessed with respect to a specified object identifier for an object of interest.
b. If there is a row with that object identifier with current flag set to true, as shown in step 452, then data in that row is used at step 456. Otherwise, the row from the parent realm with the current flag set to true is used, as tested at step 454. If there is no such row, the object is considered not to exist, as shown in step 458.
c. The row identified at step 456 is filtered by the rules engine according to the rules defined, as shown in step 460. This may be done in memory or as part of a SQL query to the DBMS. If the row returned passes the rules, as tested at step 462, it is included in the view as shown in step 464, or omitted from the view as in step 466.

Thus, when a user is operating in a particular investigative realm, the user is permitted to view only data objects that are local to the investigative realm, or in the base realm. In the intelligence context, an example of data local to an investigative realm is a note that the user added to a suspect while viewing the suspect, and an example of data in the base realm might be the results of reviewing a large number of documents that were directly loaded into in the base realm, or that were published to the base realm from another investigative realm.

In general, data local to other investigative realms is not accessible as a matter of policy. However, the revisioning database supports the operation of a global search. For instance, one may wish to see if any analysts had created a person named "John Smith" in an investigative realm but had failed to publish him to the base realm.

In step 410, a particular view of the data is created, and the view includes only such data objects as the first analyst is permitted to view based upon the base realm, the first analyst's current investigative realm, and the installed rules. In step 412, a display of the particular view is provided to the first analyst.

Thus, one effect of the method herein is that a revisioning database containing data objects can provide automatic controlled delivery of the data to data analysts based on a hierarchy of realms applied at the object level, rather than user privileges or roles. The view of each analyst is consistent with that analyst's edits to the data objects, and multiple analysts can concurrently receive different views of the same data objects based on separate sets of changes to the data objects. In other embodiments, the same kinds of controls may be applied to receivers of data other than analysts, such as export files, data realms, and other systems and applications.

With one embodiment, implemented using technology from Palantir Technologies, Inc. of Palo Alto, Calif., each analyst experiences a private view of data in the revisioning database 108 from the standpoint of a current investigative realm of that analyst. Each analyst receives an apparently private view of the data in the revisioning database 108, and values of the same data objects may be different across different investigative realms, depending on the changes made in each realm. Unlike prior approaches, the present approach does not require local copies of data on local machines of the analysts and does not involve displaying textual changes to a single set of shared data objects.

Referring now to FIG. 4B, in step 430, a publish-subscribe operation initiates when a first analyst creates data for potential publication to others or viewing by others. The first analyst may tag data with classification levels or other metadata. An administrator may use rules wizard 120 to specify rules about which data objects are allowed to be viewed by other analysts that are within the base realm to which the data objects have been published, as shown at step 431. Thus, the data objects are associated with a particular base realm, while the rules restrict access for a particular analyst.

In step 432, a second analyst subscribes to the base realm. In step 434, the second analyst receives only published rows of the data for an investigation that the second analyst is allowed to receive. In an embodiment, step 434 is implemented by rules engine 122 identifying a triggering event, such as a change in a data object in the investigative realm for the investigation to which the second analyst subscribed. In response, the rules engine 122 determines if the changed data object is within the repository realm 302 or the current investigative realm of the second analyst. If so, the data object or a view of the data in the data object is published to the second analyst in step 434. The rules applied by rules engine 122 are associated with the second analyst who is viewing the data, and serve to restrict access of the second analyst, rather than the first analyst who is publishing the data. For example, the first analyst might tag data as TOP SECRET and the second analyst may have a rule that specifies that the second analyst cannot view data that is TOP SECRET. Thus, rules operate on the data and the properties of the viewing analyst.

Additionally or alternatively, the second analyst performs a global search operation at step 436. In response to the global search operations, application logic 112 or rules engine 122 retrieves data objects that are within other investigative realms 306.

II. Summary View of Data Objects

In an embodiment, application logic 112 implements a summary view function in cooperation with wizard 120. In an embodiment, a Summary View interface enables an analyst to share an investigation, present an investigation to a team leader, or save the investigation for future reference. From the Summary View screen, a user can create a customized report by adding a title and description only for the investigation as a whole and for each individual step. The user can choose both which steps to include or exclude and a format to export the investigation. Exported investigations also automatically adapt to the user's clearance level. Thus, an effect of the approach herein is that a user can share results with anyone without having to worry about security issues.

Using revisioning database 108, application logic 112 saves every action performed by an analyst on database information. In an embodiment, records of such actions can be accessed by a History Window interface (section III herein) and the Summary View interface. The steps of the investigation displayed in the Summary View screen are equivalent to those that are seen in a Temporal view of the History Window as further discussed below. That is, the steps represent all the actions that a user has taken in the investigation, including branches, displayed in the order in which they were performed. Steps are displayed as slides within a graphical user interface. Slides not desired for export can be withheld from the report. Application logic 112 also automatically includes titles and brief descriptions of the action represented by each slide, saving users from the tedious task of entering such information manually. However, a user can edit the provided text. In an embodiment, the final, exported product is a professional presentation in any of several file formats.

Figure 5:
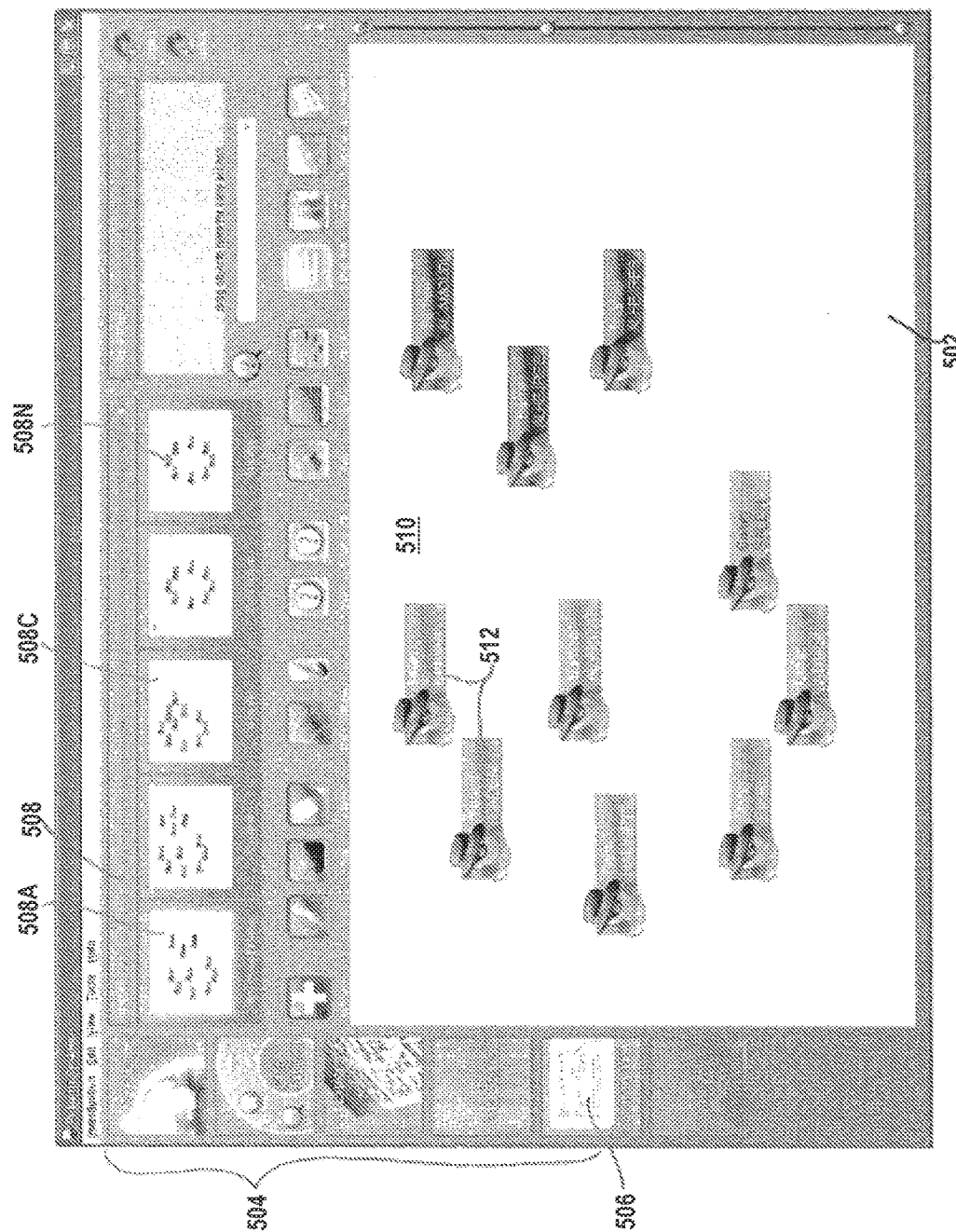
FIG. 5 illustrates an example top-level graphical user interface display that includes historical displays of changes to a revisioning database.

For purposes of illustrating an example, assume that a user has successfully completed an investigation and has been asked to present the user's findings to the rest of a team. In an embodiment, application logic 112 exposes functions of export module 114, publish-subscribe module 118, and other functions described herein in a graphical user interface that is generated and provided to user terminal 106 and to host computers of intelligence analysts 102, 104. FIG. 5 illustrates an example top-level graphical user interface display. Screen display 502 comprises a plurality of icons 504 configured to select functions of application logic 112, including a Summary View icon 506 configured to select the Summary View described further herein. A workspace 510 displays one or more object icons 512 that identify persons, places, things, or events that are the subject of an intelligence investigation and that represent data stored in revisioning database 108. In an embodiment, object icons 512 are displayed in a spatially separated topology to facilitate creating links and associations between persons, places, things, and events involved in an investigation. A history display 508 comprises an ordered plurality of slides 508A, 508C, 508N, etc., that represent thumbnail views of past arrangements of the workspace 510. Thus, viewing the history display 508 indicates how the appearance of workspace 510 has changed over time and enables a user to return to a previous state of workspace 510 by selecting a slide from within the history display 508.

Figure 6:
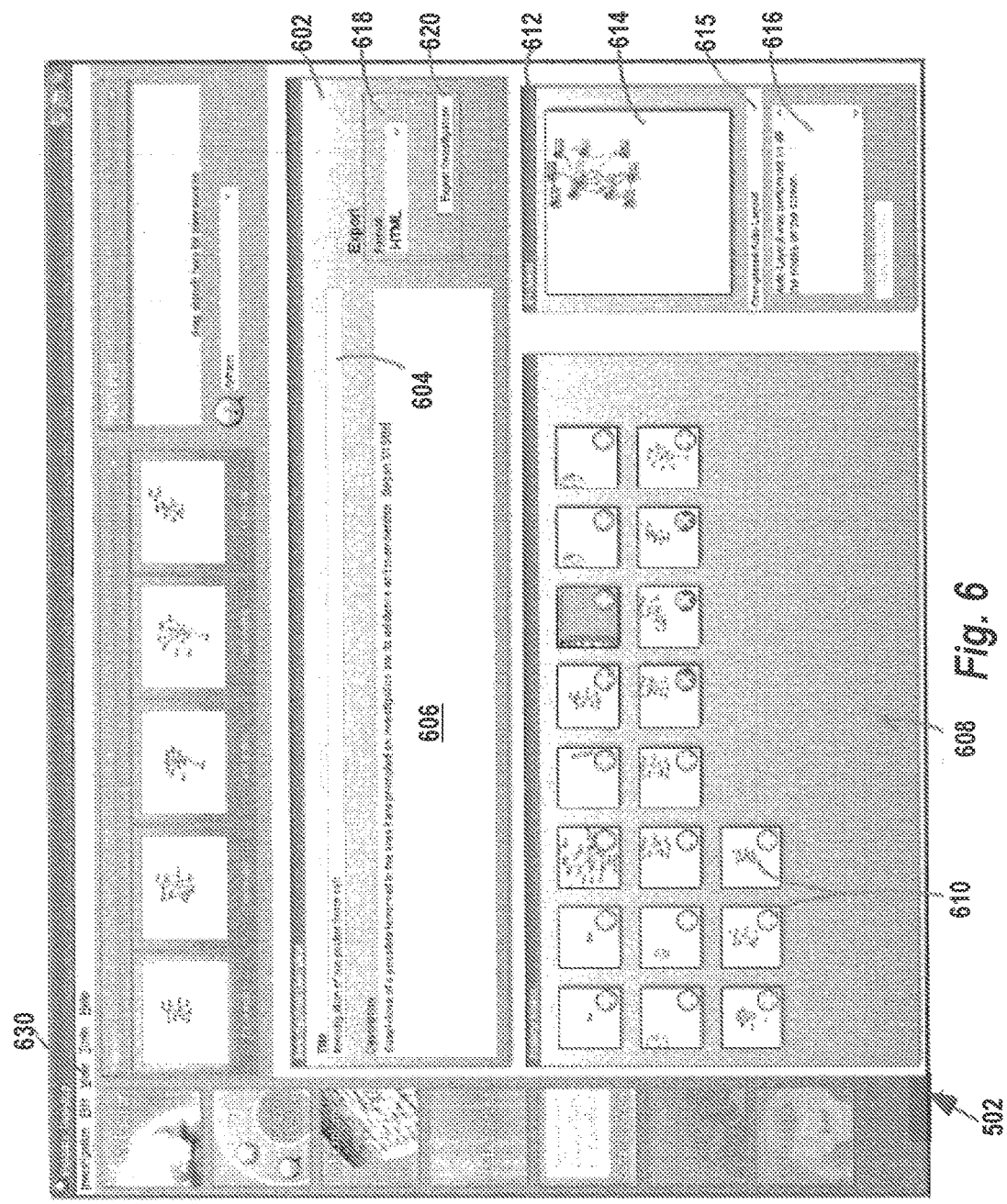
FIG. 6 illustrates an example Summary View display.

When the Summary View icon 506 is selected, in response, application logic generates and provides to user terminal 106 an updated GUI display that includes a summary view. FIG. 6 illustrates an example Summary View display. An investigation overview pane 802 comprises a title input field 604 and a description input field 606. A history slides panel 608 displays thumbnail images 610 of history slides that are candidates to appear in an exported report of an investigation. The history slides panel 608 comprises a summary of steps that occurred in an investigation. Each of the thumbnail images 610 is marked with a include symbol or exclude symbol indicating whether the associated history slide will appear in the report. In an embodiment, the include symbol is "+" and the exclude symbol is "X". In general, using the Summary View of FIG. 6, a user enters a title and description for the investigation, chooses the most relevant steps for the report with history slides panel 608, and selects a preferred export format using export pane 618. Selecting an export button 620 causes application logic to generate a presentation or report in the specified format.

Figure 7:
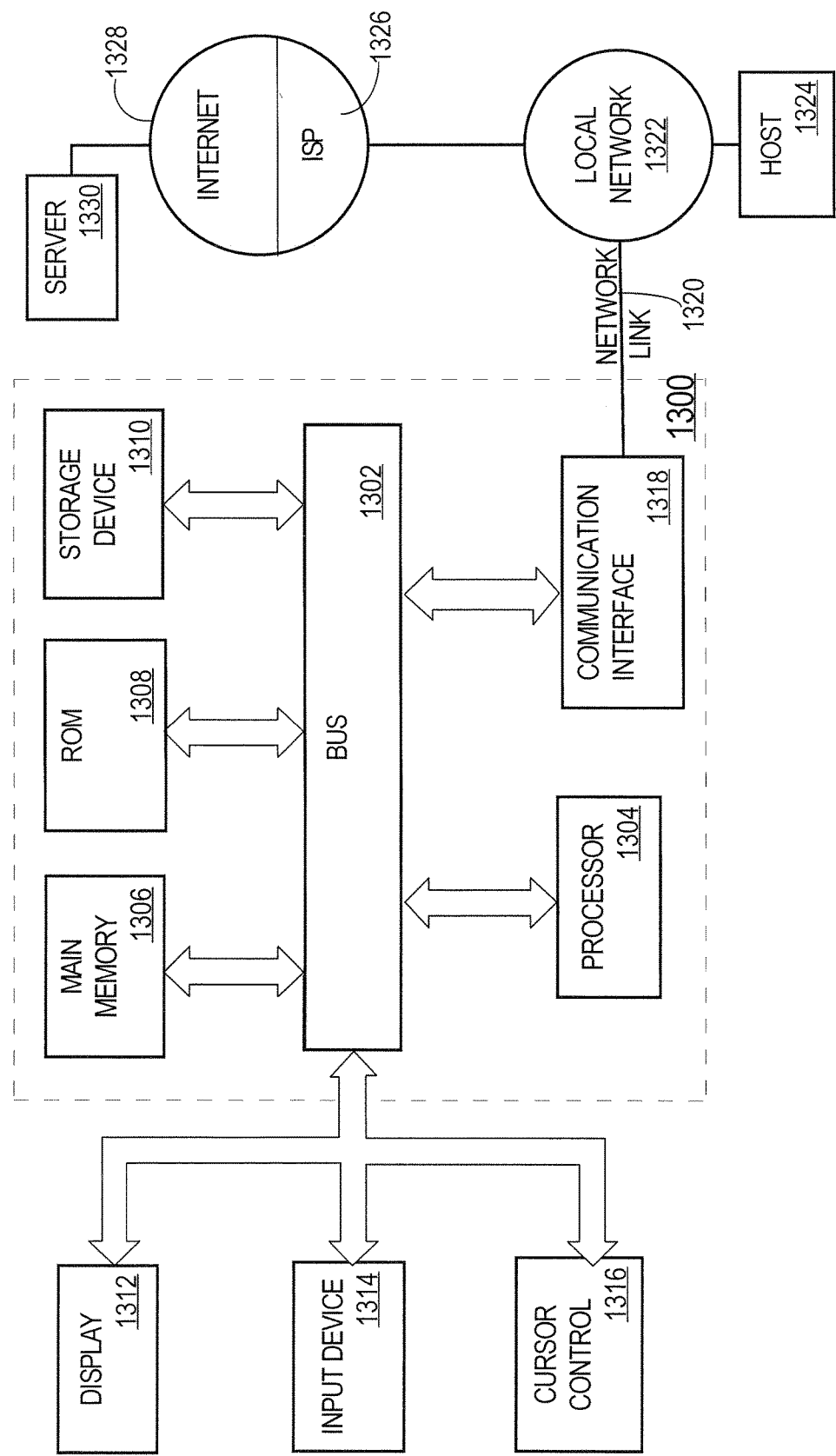
FIG. 7 illustrates a computer system with which an embodiment may be implemented.

Upon displaying the history slides panel 608, a user may select a particular step in an investigation. In response, in a Preview panel 612, the application logic 112 displays a snapshot 614 of the selected step, a title 615, and a description 616 of the selected step. FIG. 7 is an enlarged view of the Preview panel. Both the description 616 and the title 615 can be editing by selecting the appropriate box, making the desired changes, and selecting a "Save Changes" button 702. In an embodiment, a user can select a specific step or thumbnail 610 in the History Slides panel and can change the include symbol or exclude symbol to signal whether to include the associated slide in your report.

The user may enter a title in title input field 604 and a description in description input field 606. In an embodiment, a user may select an export format from export panel 618 using a pull-down menu or other graphical user interface widget, and may complete an export operation by selecting an "Export Investigation" button 620. In response, application logic 112 automatically opens the exported investigation in the selected format for viewing and sharing.

III. Example Implementation Hardware

FIG. 7 is a block diagram that illustrates a computer system 1300 upon which an embodiment of the invention may be implemented. Computer system 1300 includes a bus 1302 or other communication mechanism for communicating information, and a processor 1304 coupled with bus 1302 for processing information. Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

The invention is related to the use of computer system 1300 for implementing the techniques described herein. According to one embodiment of the invention, those techniques are performed by computer system 1300 in response to processor 1304 executing one or more sequences of one or more instructions contained in main memory 1306. Such instructions may be read into main memory 1306 from another machine-readable medium, such as storage device 1310. Execution of the sequences of instructions contained in main memory 1306 causes processor 1304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1300, various machine-readable media are involved, for example, in providing instructions to processor 1304 for execution. Such a medium may take many forms, including but not limited to, non-volatile media, volatile media, and transmission media. Non-volatile media includes, for example, optical or magnetic disks, such as storage device 1310. Volatile media includes dynamic memory, such as main memory 1306. Transmission media includes coaxial cables, copper wire and fiber optics, including the wires that comprise bus 1302. Transmission media can also take the form of acoustic or light waves, such as those generated during radio wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infrared transmitter to convert the data to an infrared signal. An infrared detector can receive the data carried in the infrared signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the worldwide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are exemplary forms of carrier waves transporting the information.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution. In this manner, computer system 1300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
storing different versions of data objects in a database comprising a base set of data and a plurality of child sets of data;
wherein the plurality of child sets of data comprises a first child set of data and a second child set of data;
wherein the first child set of data stores a first plurality of data object versions that are inaccessible to the base set of data and the second child set of data;
wherein the base set of data stores a second plurality of data object versions that are accessible to the first child set of data and the second child set of data;
wherein the second child set of data stores a third plurality of data object versions that are inaccessible to the base set of data and the first child set of data;
receiving, from a first user that is currently within a first child set of data, a command to send a particular version of a particular data object from the first child set of data to the base set of data;
in response to the command, sending the particular version of the particular data object but not one or more other versions of the particular data object from the first child set of data to the base set of data; receiving, from a second user that is currently within the second child set of data, a request to access any version of the particular data object that has been sent to the base set of data;

in response to the request, and based at least in part on the sending of the particular version of the particular data object to the base set of data, allowing the second user to access the particular version of the particular data object that has been sent to the base set of data;

wherein the first child set of data is separate from the second child set of data;

wherein the first user is separate from the second user;

wherein the method is performed by one or more computing devices.

2. A method as recited in claim 1, further comprising:

receiving definitions of one or more rules, wherein each rule restricts access for one or more users to one or more data objects regardless of which set of data contains the one or more data objects;

wherein allowing the second user to access the particular version of the particular data object is based on determining that the one or more rules do not restrict access for the second user to the particular data object as well as being based on the base set of data and a version identifier value for the one or more data objects.

3. A method as recited in claim 1, further comprising:

detecting that a change has occurred in the particular data object;

wherein allowing the second user to access the particular version of the particular data object is based on determining whether the particular data object can be provided to the second user based on the base set of data and a version identifier value for the particular data object.

4. A method as recited in claim 1, wherein allowing the second user to access the particular version of the particular data object comprises providing only a selected subset of rows of a revisioning database to the second user.

5. A method as recited in claim 1, further comprising:

creating and storing an object table comprising rows that represent the first plurality of data object versions and the second plurality of data object versions and columns that represent, for each of the first plurality of data object versions and the second plurality of data object versions, an associated set of data, a version value, and a pointer to a previous version, wherein said associated set of data is different from said version value.

6. A method as recited in claim 5, further comprising asynchronously receiving, from different users, a plurality of changes to the particular data object, and in response thereto, creating a new row in the object table for each of the changes.

7. A method as recited in claim 1, wherein sending the particular version of the particular data object to the base set of data comprises sending the particular version of the particular data object to the base set of data without sending data directly between the first user and the second user.

8. A method as recited in claim 1, further comprising:

creating and storing one or more data object versions in a revisioning database;

wherein the revisioning database associates each data object version of the one or more data versions to a version identifier value and to an identifier value for a set of data.

9. A computer-readable non-transitory storage medium having one or more program instructions recorded thereon, which instructions, when executed by one or more processors, cause the one or more processors to perform:

storing different versions of data objects in a database comprising a base set of data and a plurality of child sets of data;

wherein the plurality of child sets of data comprises a first child set of data and a second child set of data;

wherein the first child set of data stores a first plurality of data object versions that are inaccessible to the base set of data and the second child set of data;

wherein the base set of data stores a second plurality of data object versions that are accessible to the first child set of data and the second child set of data;

wherein the second child set of data stores a third plurality of data object versions that are inaccessible to the base set of data and the first child set of data;

receiving, from a first user that is currently within a first child set of data, a command to send a particular version of a particular data object from the first child set of data to the base set of data;

in response to the command, sending the particular version of the particular data object but not one or more other versions of the particular data object from the first child set of data to the base set of data; receiving, from a second user that is currently within the second child set of data, a request to access any version of the particular data object that has been sent to the base set of data;

in response to the request, and based at least in part on the sending of the particular version of the particular data object to the base set of data, allowing the second user to access the particular version of the particular data object that has been sent to the base set of data;

wherein the first child set of data is separate from the second child set of data;

wherein the first user is separate from the second user.

10. A computer-readable medium as recited in claim 9, further comprising instructions which when executed cause:

receiving definitions of one or more rules, wherein each rule restricts access for one or more users to one or more data objects regardless of which set of data contains the one or more data objects;

wherein allowing the second user to access the particular version of the particular data object is based on determining that the one or more rules do not restrict access for the second user to the particular data object as well as being based on the base set of data and a version identifier value for the one or more data objects.

11. A computer-readable medium as recited in claim 9, further comprising instructions which when executed cause:

detecting that a change has occurred in the particular data object;

wherein allowing the second user to access the particular version of the particular data object is based on determining whether the particular data object can be provided to the second user based on the base set of data and a version identifier value for the particular data object.

12. A computer-readable medium as recited in claim 9, wherein the instructions when executed cause creating and storing an object table comprising rows that represent the first plurality of data object versions and the second plurality of data object versions and columns that represent, for each of the first plurality of data object versions and the second plurality of data object versions, an associated set of data, a version value, and a pointer to a previous version, wherein said associated set of data is different from said version value.

13. A computer-readable medium as recited in claim 12, further comprising instructions which when executed cause asynchronously receiving, from different users, a plurality of changes to the particular data object, and in response thereto, creating a new row in the object table for each of the changes.

14. A computer-readable medium as recited in claim 9, wherein sending the particular version of the particular data object to the base set of data comprises sending the particular version of the particular data object to the base set of data without sending data directly between the first user and the second user.

15. A computer-readable medium as recited in claim 9, further comprising instructions which when executed cause:
   creating and storing one or more data object versions in a revisioning database; wherein the revisioning database associates each data object version of the one or more data versions to a version identifier value and to an identifier value for a set of data.

16. A computer-readable medium as recited in claim 9, wherein allowing the second user to access the particular version of the particular data object comprises providing only a selected subset of rows of a revisioning database to the second user.

* * * * *